Dec. 22, 1964 R. T. BURNETT 3,162,273
LEVER ACTUATED AND ANCHORED BRAKE
Filed May 6, 1960 9 Sheets-Sheet 1

INVENTOR.
RICHARD T. BURNETT
BY John A. Young
ATTORNEY

Dec. 22, 1964   R. T. BURNETT   3,162,273
LEVER ACTUATED AND ANCHORED BRAKE
Filed May 6, 1960   9 Sheets-Sheet 2
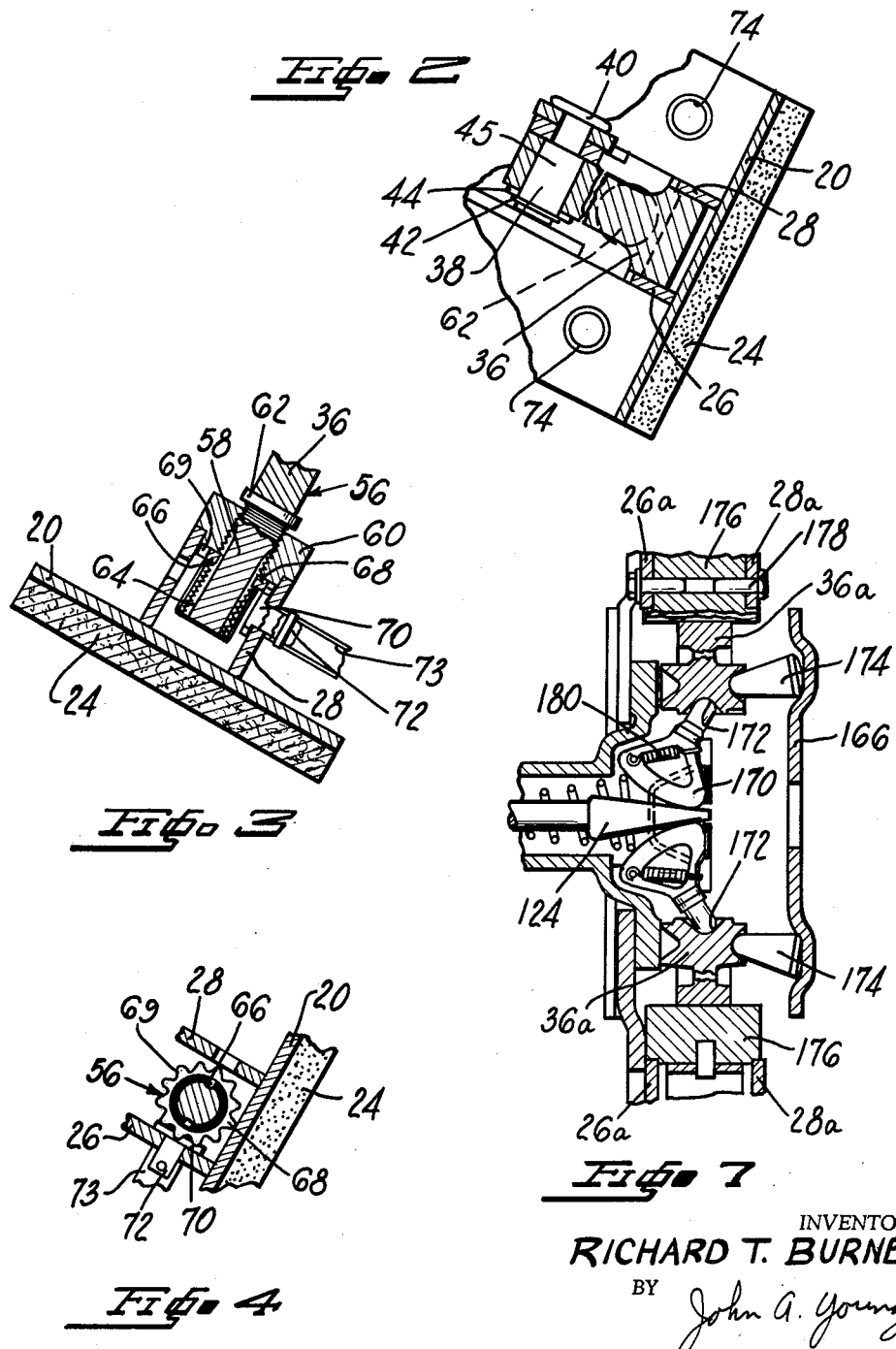
INVENTOR.
RICHARD T. BURNETT
BY John A. Young
ATTORNEY

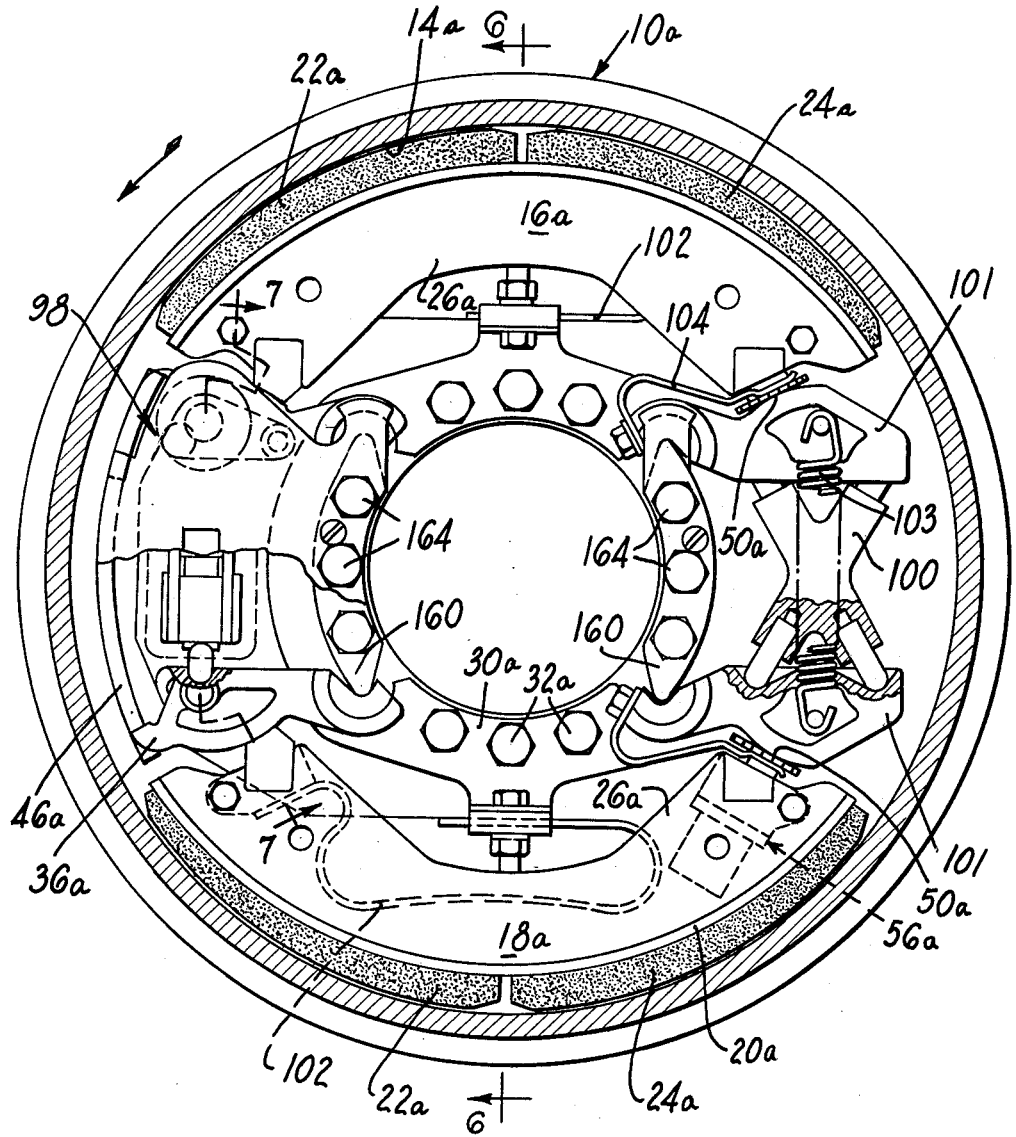

Dec. 22, 1964    R. T. BURNETT    3,162,273
LEVER ACTUATED AND ANCHORED BRAKE
Filed May 6, 1960    9 Sheets-Sheet 5

INVENTOR.
RICHARD T. BURNETT
BY
John A. Young
ATTORNEY

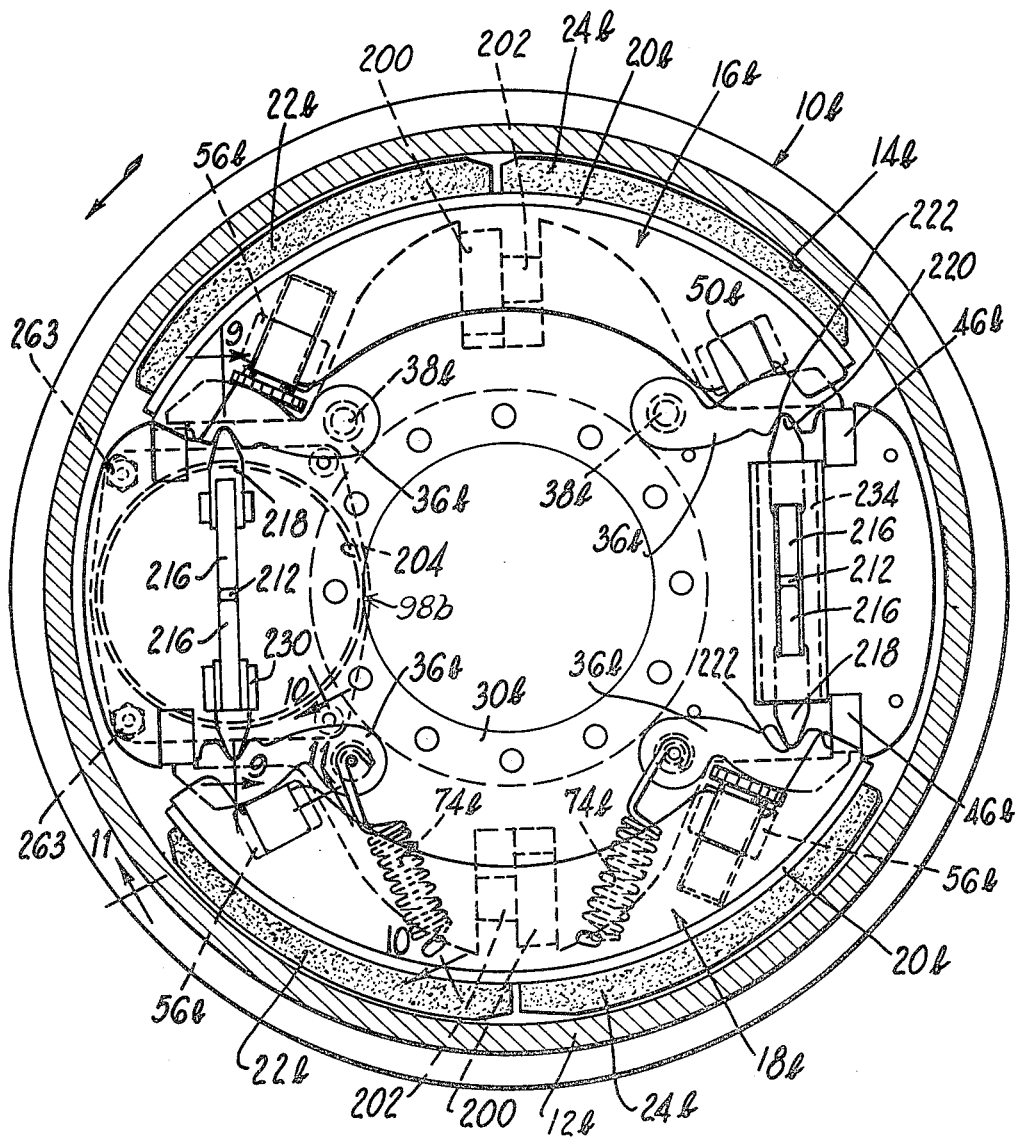

Dec. 22, 1964  R. T. BURNETT  3,162,273
LEVER ACTUATED AND ANCHORED BRAKE
Filed May 6, 1960  9 Sheets-Sheet 7
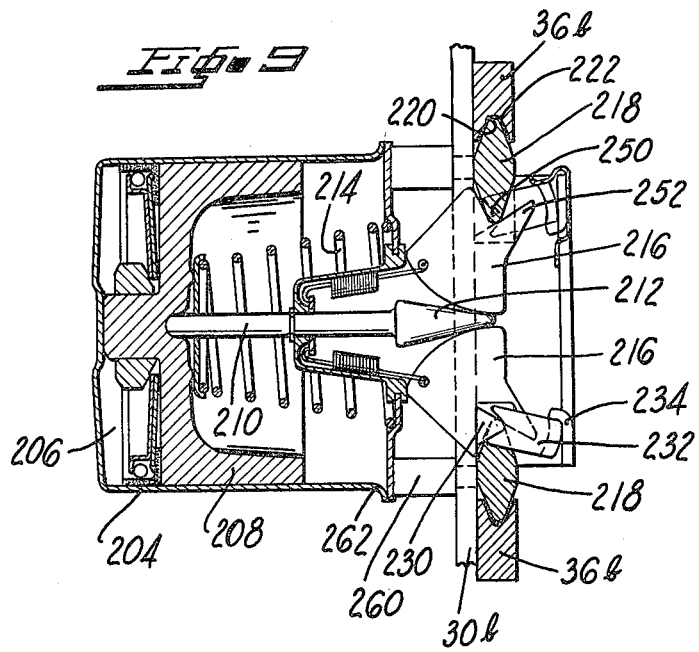
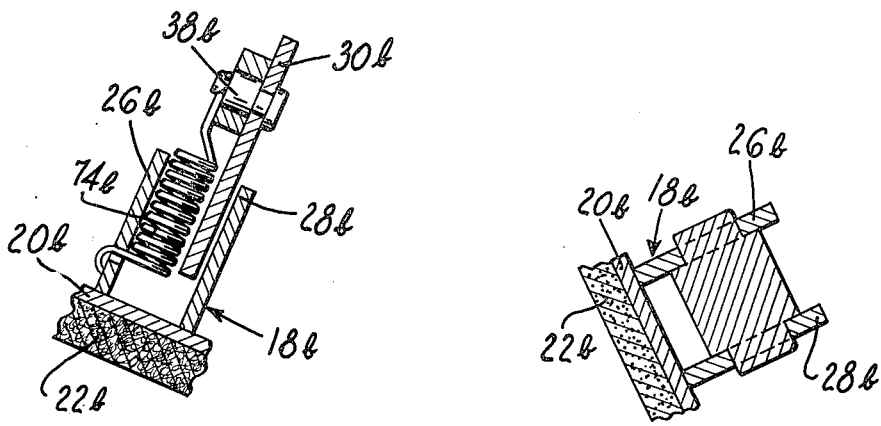
INVENTOR.
RICHARD T. BURNETT
BY John A. Young
ATTORNEY United States Patent Office 3,162,273
Patented Dec. 22, 1964

3,162,273
LEVER ACTUATED AND ANCHORED BRAKE
Richard T. Burnett, South Bend, Ind., assignor to The Bendix Corporation, a corporation of Delaware
Filed May 6, 1960, Ser. No. 27,327
21 Claims. (Cl. 188—78)

This invention relates to brakes which are especially adapted for high torque capacities such as those normally required by heavy duty trucks, busses, trailers, and the like.

A substantial number of heavy duty truck brakes now in use comprise fixed anchor non-servo shoe type brakes actuated by a pneumatically operated S-cam which effects spreading movement of the shoes. The required capacity of the brake is obtained by simply enlarging the brake parts to the point where they can provide the heavy braking forces necessary to control vehicle movement. As a result, the brake tends to be extremely bulky and heavy weight. What the brake lacks in inherent effectiveness is compensated for by enlargement of the parts so that they will be adequate. As a result, since the brakes are part of the unsprung load of the vehicle, larger axles are required because of the bulk and weight of the brake. The described brakes are costly because of their large size and this leads to over-all vehicle cost. Although this situation has existed for many years, no one, prior to the present invention, has proposed an acceptable light weight construction brake, which will meet the high torque requirements of heavy duty vehicles.

Accordingly, it is a primary object of the present invention to provide a small light weight brake which is more economical to produce than the presently used fixed anchor non-servo shoe type brakes and which will yet have the necessary torque capacity by means of components which are arranged and constructed mor efficiently to meet the brake requirements of the vehicle.

It is a further object of the invention to provide a heavy duty, light weight brake with an adjusting means for the brake shoe which will compensate for wear of the shoe but independently of the actuating means. Since the brake shoe adjuster and the shoe operating means are independent, the stroke of the actuating means is not increased by expansion of the shoes from adjuster operation as is the usual case.

Another object of the invention is to provide a light weight effective brake having floating brake shoes with the center of engagement pressure between the shoes and the opposing drum surface located substantially midway between the ends of the shoes to provide a lining wear pattern which utilizes a greater proportion of the shoe lining and hence is more efficient, the brake being substantially equally effective in both forward and reverse drum movement to obtain a symmetrical brake structure.

It is a further object of the present invention to provide a novel actuating and anchoring means utilizing a system of levers which can be proportioned to obtain the center of pressure between the shoe and its opposed drum surface, substantially midway between the ends of the shoes. There results a more efficient utilization of the lining and an equal effectiveness of the shoe for forward and reverse directions of rotation of the drum.

Yet another object of this invention is to provide an actuating lever which has at least a portion thereof disposed between actuating means and an adjacent shoe end for transmitting actuating force from said actuating means to said shoe with said lever being pivotally mounted to a stationary support at one end and anchoring at its other end to anchoring means.

Still a further object of the invention is to provide an association between a lever, utilized to transmit actuating force to a brake shoe, and the brake shoe for axially positioning said shoe relative to a brake drum.

Another object of the invention is to utilize space within the brake more efficiently so that a wide variety of different actuating means may be provided, including hydraulic actuating means, pneumatic actuating means, and force transmitting means between the shoes, including linkage for effecting servo action and/or equalized servo action.

The actuators in the present invention are adapted to the fixed motion of the leverage system rather than the irregular free floating movement of the shoes, and this makes possible the equalizing lining wear pattern previously described and also a more efficient utilization of brake space whereby it is possible to select the actuating means, viz., hydraulic, pneumatic, or mechanical which is best adapted to the particular usage.

Other objects and features of the invention will become apparent from a consideration of the following description, which proceeds with reference to the accompanying drawings, wherein:

FIGURE 1 is a side elevation view of a two leading shoe brake which is hydraulically actuated by a pair of double acting wheel cylinders;

FIGURES 2, 3, and 4 are section views taken on the respective section lines 2—2, 3—3, and 4—4 of FIGURE 1;

Figure 5:
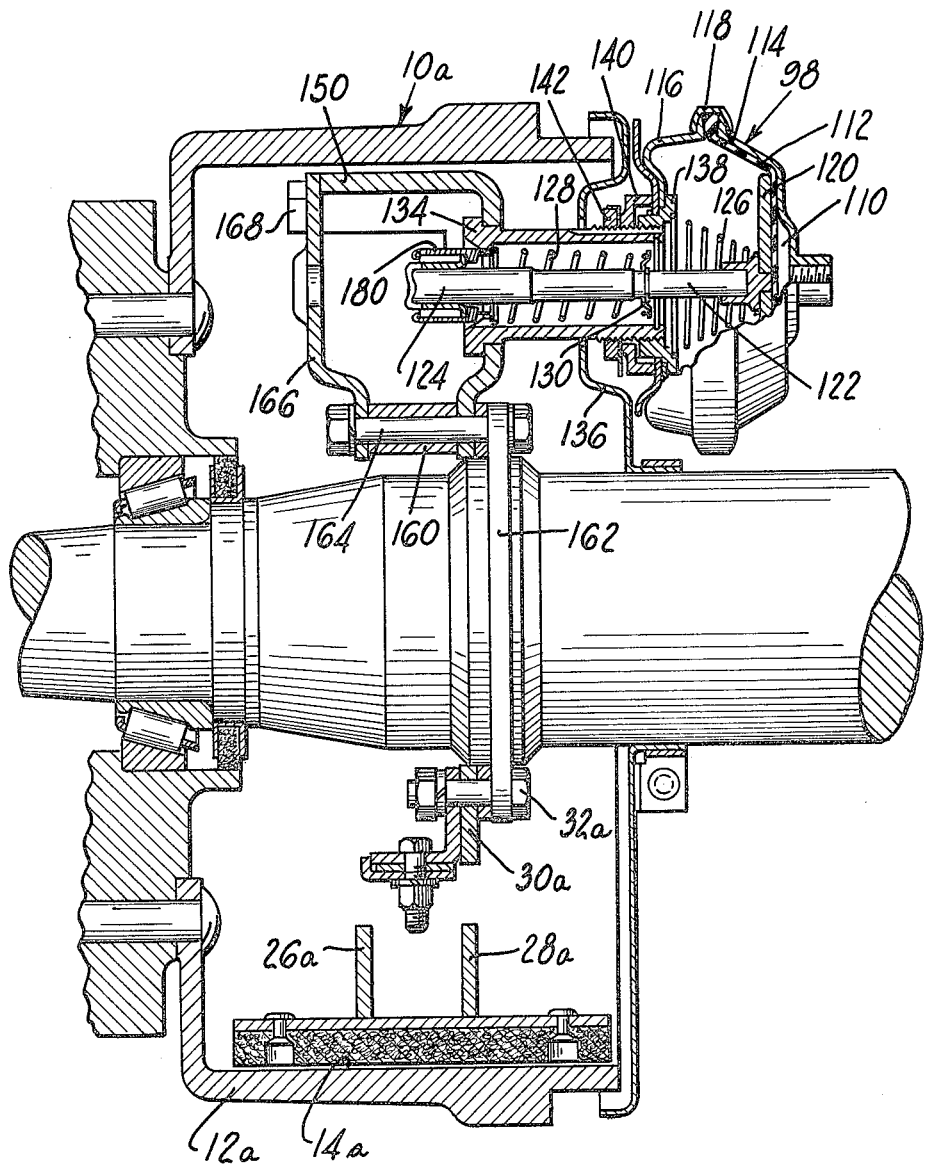
FIGURE 5 is a side elevation view of a pneumatically actuated brake having one pair of the adjacent shoe ends connected by a linkage which transmits applying force between the shoes in substantially the same amount provided by the pneumatic actuator.
Figure 12:
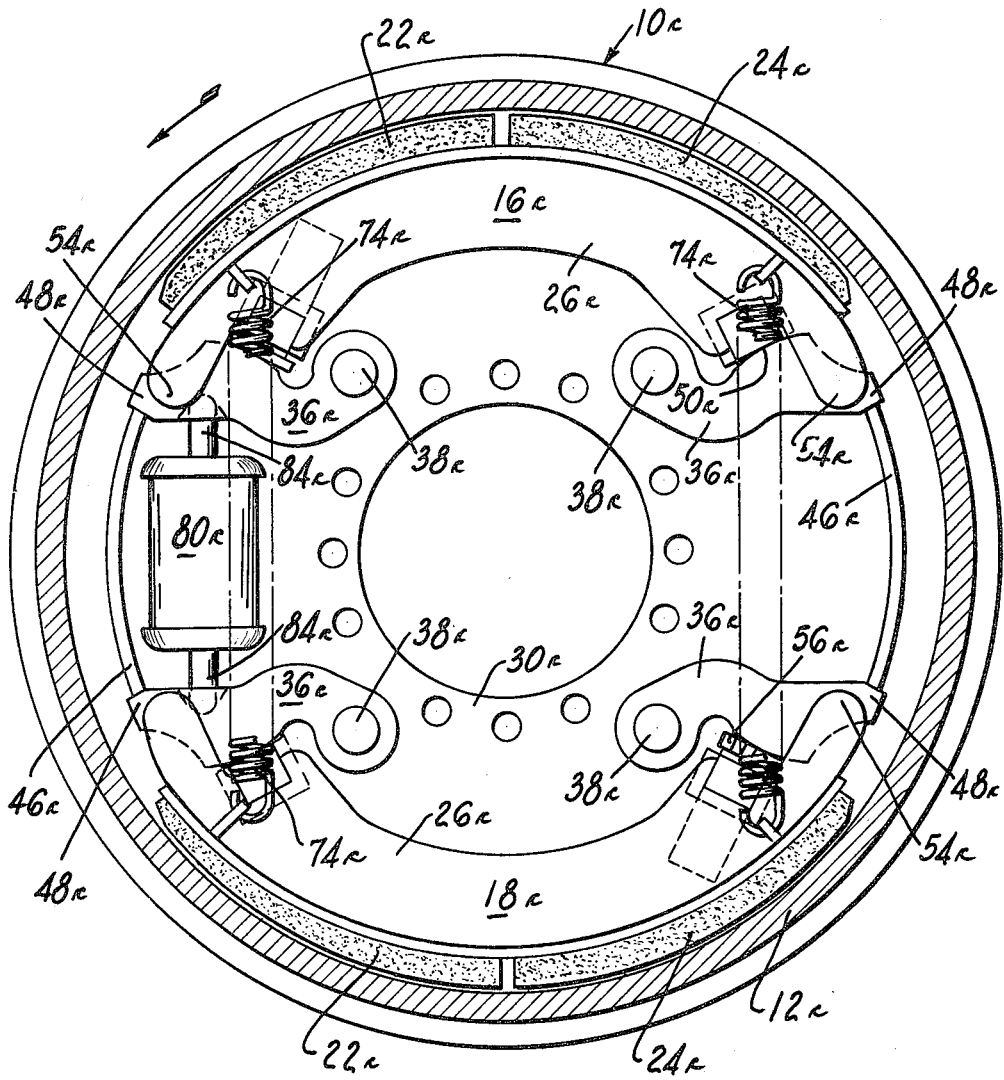
Figure 13:
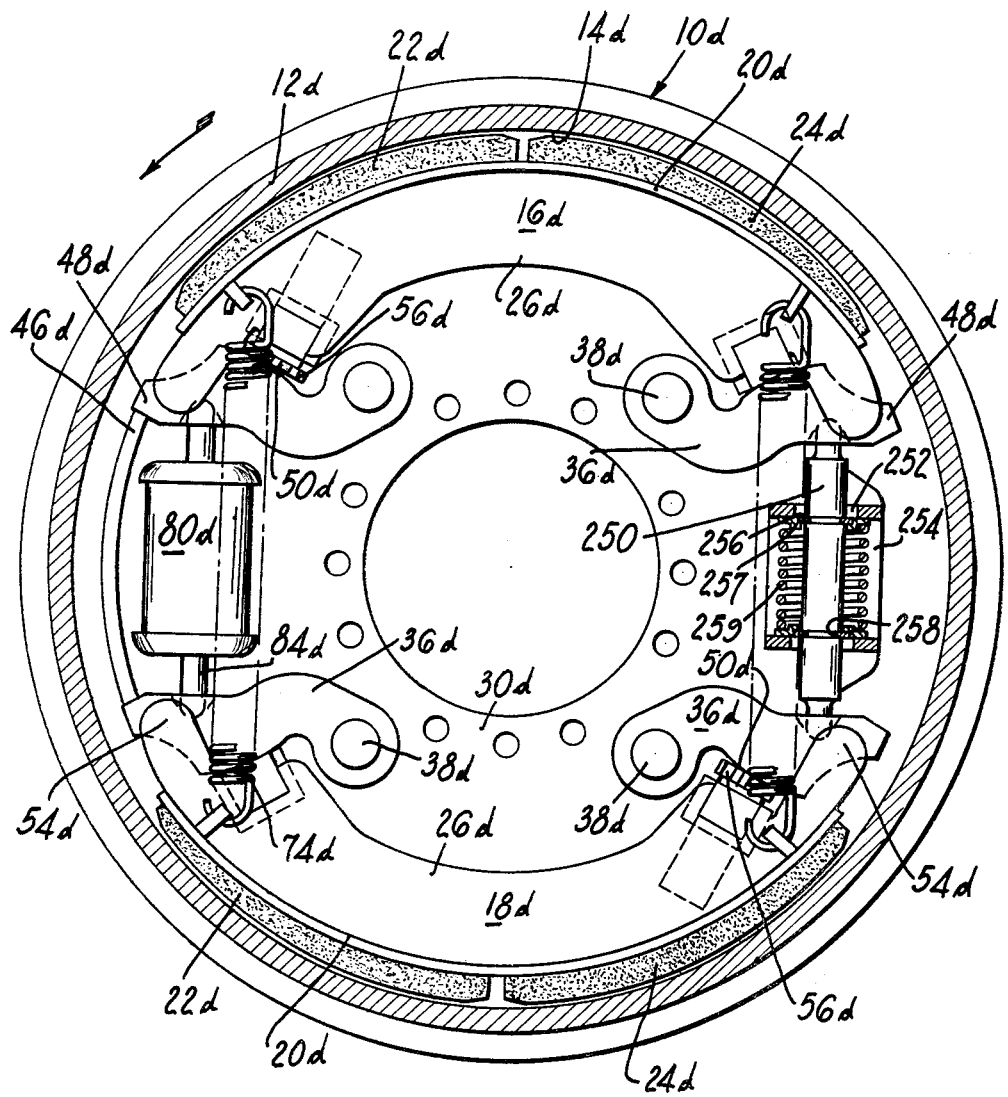

FIGURES 6 and 7 are section views taken on the respective sections 6—6 and 7—7 of FIGURE 5;

FIGURE 8 is a side elevation of the brake having two pneumatic actuators, one for each of the opposite pairs of ends of the shoes;

FIGURES 9, 10, and 11 are section views taken on respective section lines 9—9, 10—10, and 11—11 of FIGURE 8;

FIGURE 12 is a side elevation view of a brake in accordance with the present invention which is of a non-servo configuration, i.e., one shoe is a leading shoe while the other shoe is a trailing shoe in each direction of drum rotation; and, FIGURE 13 is a further embodiment of the invention showing in side elevation view a servo brake incorporating principles of the present invention, in which the tangential "wiping" action of one of the shoes is transmitted to the other shoe as applying effort thereon, this brake being the most effective of the various brake configurations for an equivalent weight of the components.

Referring now to the embodiment shown in FIGURES 1 to 4, the brake, designated generally by reference numeral 10, includes a rotatable brake drum 12 having a cylindrical braking surface 14 and a pair of identically constructed brake shoes 16 and 18 each including an arcuate rim 20 having friction material segments 22 and 24, and two transverse strengthening webs 26 and 28.

The shoes are carried by a torque plate 30 which is fastened by a ring of bolts 32 to a nonrotatable part of the vehicle, as for example, an axle flange (not shown).

At each shoe end is a lever 36 which is mounted for pivotal movement on anchor pin 38 received through torque plate 30. The anchor pin 38 is riveted at end 40 (FIG. 2); a retaining ring 42 and washer 44 retain the lever on the enlarged diameter section 45 of anchor pin 38. At the end of each lever opposite its pivotal mounting is an abutment 46 formed from a turned up portion of the torque plate and is located to engage end 48 of the lever whereby the lever is supported at each of its opposite ends as it receives the anchoring load of the associated brake shoe.

Figure 4A:
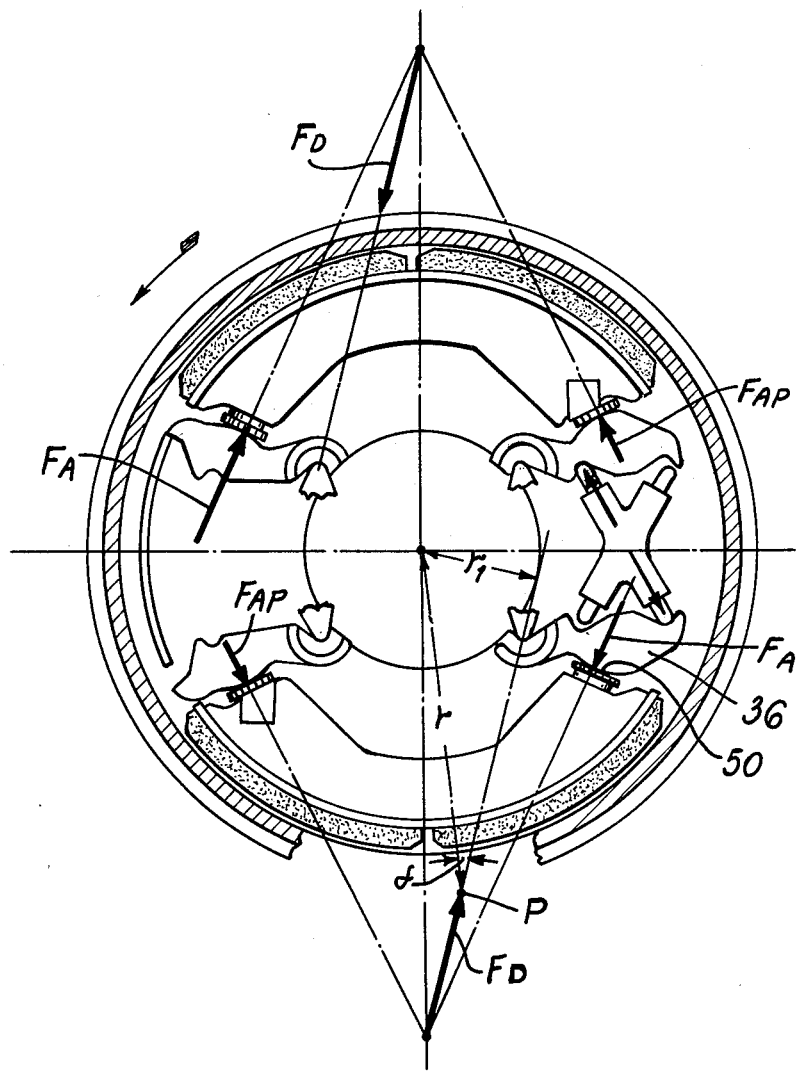
FIGURE 4A is a force diagram of the brake shown in FIGURE 1, illustrating the anchoring area applying forces on the shoe and the resultant drum reaction force.

Referring to FIGURE 4A, the anchoring force $F_a$ is shown at the upper end of the brake shoe, the condition which exists during braking with counterclockwise drum rotation. The anchoring force acts perpendicularly to the surfaces of engagement between lever 36 and its shoe end. By controlling the configuration of the anchoring surface 50 of the lever, i.e., by suitably disposing the angularity of the anchoring surfaces, it is possible to locate the direction of the anchoring force $F_a$ which, together with the applying force $F_{ap}$ locates the drum reaction force $F_d$ which originates at the intersection of applying force $F_{ap}$ and anchoring force $F_a$ and is at an angle such that an extension of $F_d$ is tangent to the friction circle whose center is the geometrical center of the brake.

The radius of the friction circle is derived from the coefficient of friction of the lining segments 22 and 24 and is obtained from the value $$\gamma_1 = \gamma \sin (\arctan \mu)$$

where $\mu$ is the coefficient of friction and
$\gamma$ = distance from the center of the brake to the point P which is defined as the location of intersection of radius $\gamma$ with $F_d$ such that the angle $\alpha = \arctan \mu$ and $\mu$ is the coefficient of friction previously described.

The point of intersection of $F_d$ with the shoe surface is considered the center of pressure and to the extent that the center of pressure may be brought midway between the ends of the shoes then greater utilization of the lining segments is provided. The appropriate disposition of $F_d$ is then obtained by means of appropriate configuration of surface 50 which determines the sense of $F_a$. The length of $F_d$ is a measure of the output of the brake and the ratio of $F_d$ to $F_{ap}$ is a measure of the effectiveness of the brake.

As the drum reaction force $F_d$ moves closer to the anchor it increases proportionally to $F_{ap}$ and hence the brake becomes more effective but less controllable. The configuration of surface 50 is thus important in (a) locating the center of pressure to obtain an optimum pattern of wear (b) it determines the appropriate degree of brake effectiveness and (c) the appropriate degree of controllability. For convenience the braking surface 50 is referred to herein as a radial surface but the importance of such construction lies not in its being coextensive with a radius (in fact it is only approximately so) but rather in the proper location of the resultant drum force $F_d$ relatively to the brake shoe. These surfaces 50 on the levers provide both pivotal and sliding movement of the shoe ends thereon. Generally speaking, in other brakes, the center of engagement pressure between the drum surface and the shoe friction lining is at the "heel" or anchored end of the shoe. Since the shoe must be serviced when the lining wear reaches the rim along any portion of the rim, the pattern of lining wear progressing from the least amount at the toe to the greatest amount at the heel results in inefficient utilization of the lining. Because the point of greatest engagement pressure is approximately midway between the shoe ends the taper of the lining is constructed to be thinnest at the toe and heel ends of the shoe and the greatest lining thickness is provided midway along the arcuate length of the shoe. The present invention is the first instance of utilizing lever actuation with a floating shoe arrangement, having equal effectiveness in both forward and reverse drum rotation with the center of pressure located substantially in the optimum position described.

While previous structures have included radial anchoring surfaces to control the braking effectiveness and selectively locate the point of maximum wear, these prior structures are concerned with fixed anchoring means having their faces so disposed to the brake shoe that the resultant anchoring force passes through the shoe at some preferred location. See for example, U.S. Patent No. 2,822,065 issued February 4, 1958; U.S. Patent No. 2,269,268 issued January 6, 1942; and U.S. Patent No. 2,755,889 issued July 24, 1956 for various examples of the described anchoring arrangement.

Each shoe web 26 and 28 has a portion 54 overlying its actuating lever to assist in axially positioning the shoe with respect to the drum surface 14.

Between one end of each shoe and its lever 36 is an adjusting means 56 (FIGURES 3 and 4) comprising a threaded bolt 58 which is passed through the threaded opening of a nut 60 seated against webs 26 and 28 of the brake shoe. The bolt 58 has an end 62 which bears against the actuating lever 36 and the shank of the bolt has keyways 64 to receive lugs 66 of a star wheel 68, the outer teeth 69 of which mesh with a gear wheel 70 formed integrally with stem 72 which extends through one of the webs of the shoe and is fastened to a sleeve 73 and is turned manually to effect adjustment. Thus, the stem 72 is turned, rotating the star wheel 68 which can slide axially along the shank of bolt 58 and also cause the bolt 58 to turn. Since the nut 60 is held against the shoe, the nut 60 will travel along the length of the bolt 58 away from the lever 36, and bring the lining segments 22 and 24 closer to the cylindrical surface 14. Since both shoe ends are slidable, only one shoe end need be manually adjusted because the shoe can slid on its ends to relieve overadjustment at either end and the lining segments will thereby conform with the opposed cylindrical drum surface 14.

The shoes are held in their normally retracted position by means of four return springs 74 which are stretched between adjacent shoe ends, urging the shoes radially inwardly to disengage lining segments 22 and 24 from the cylindrical braking surface 14. The spring force, acting through the shoes, tends to pivot each lever in such direction that its end 48 engages the fixed abutment 46 so that the retracted position of the shoes is defined by pivotal movement of the lever 36 into engagement with fixed abutment 46.

As will be seen from a consideration of all of the embodiments, a variety of actuating means may be provided between the ends of the shoes to operate the levers which communicate applying or actuating force on the shoe ends; the particular actuating means shown in the embodiment of FIGURES 1 to 4 comprises hydraulically operated wheel cylinders 80 each including two oppositely acting pistons 82 with piston rods 84 connecting the piston and lever 36. Each piston has the usual sealing cup 86 with a spring 88 keeping the cups seated. Inlet ports 90 and 92 are also included for their usual function.

In brake operation, assuming counterclockwise rotation of the drum corresponding to forward vehicle movement, the brake is actuated by communicating fluid pressure to the two wheel cylinders which pivot levers 36 on bolts 38 causing the friction segments 22 and 24 of shoes 16 and 18 to engage the cylindrical surface 14 of the drum 12. Shoe 16 anchors at its left hand end (FIGURE 1) on its lever 36 and shoe 18 anchors at its right hand end on lever 36. The two shoes each provide leading shoe braking, that is to say, both are self-energizing and each does an equal amount of braking work so that maximum utilization is obtained of each brake shoe. Since each shoe is self-energizing, there is provided a maximum degree of individual braking action. Because the lever 36 which receives the anchoring load of the shoe is held at each of its opposite ends by the pivot bolt 38 and abutment 46 the anchoring load is distributed between two points and the structure for taking the braking load may therefore be made correspondingly smaller because the load is not concentrated at a single location. Since the shoe is free both to pivot and slide at its anchored end at the point of engagement with the lever 36 there is a free floating shoe action which permits the friction segments to conform with the opposed cylindrical surface 14 of the drum, thus preventing "pinching" of the lining and localized wear of the friction segments. In other words, the wear pattern is more evenly distributed over the entire arcuate length of the friction segments.

I am aware that location of this center pressure has been located in previous construction by means of suitable construction of the anchoring surface and the considerations involved in computing the appropriate location of the anchoring surface is a matter of general knowledge to those skilled in the art and therefore I do not assert this to be a part of the present invention. What is significant in the present invention however is that the anchoring surface may be constructed in a lever which also serves as an actuating means so that the brake can be equally effective in both forward and reverse directions of drum rotation.

Referring to the actuated ends of shoes 16 and 18, viz., the right hand end of shoe 16 and the left hand end of shoe 18, the piston 82 acting through its piston rod 84 functions to turn the lever 36 and turning of the lever is communicated as applying effort on the shoe end. Because the applying force of the wheel cylinder is multiplied through the lever, then the diameter of the piston may be reduced, this being a significant factor because in heavy duty brakes radial space in the brake is generally most critical. As a result, smaller diameter cylinders may be used between the cylindrical drum surface and the mounting bolts. Because movement of the pistons is related to the pivotal movement of the levers which is a fixed type movement, rather than an erratic and irregular shoe movement, this simplifies the construction and design of the wheel cylinder actuator and makes it possible to substitute a variety of different actuating means, as will be seen in later embodiments of the invention. Usage of the lever 36 does necessitate a somewhat greater stroke of the piston but such increase is not prohibitive and additional piston stroke is not required to follow up wear of the lining. Since, in the case of heavy duty brakes, the lining segments may be in the order of ¾" in thickness it would be prohibitive to meet piston stroke requirements for both lever movement and lining thickness. Accordingly, a novel arrangement of the adjusting means 56 is provided wherein the adjuster is located between the end of the shoe and the lever 36 so that the shoe may be moved closer to the drum to compensate for wear but without adding to the stroke requirement of the piston for actuating the shoe. Thus, with the levers in their fully retracted position shown in FIGURE 1, the piston stroke requirement is that necessary to take up the lining clearance shown in FIGURE 1; and, if the lining wear were to be substantially down to the rim, it can be seen that the adjusters will move the shoe away from the levers to compensate for such wear so that the running clearance is reestablished and the same piston stroke will produce brake engagement unaffected by such adjustment.

When the brake is released, fluid pressure in the wheel cylinder is relieved and the return springs 74 fastened between the shoe ends draw the shoe ends together thereby pivoting the levers 36 until they are brought into engagement with abutments 46, thus defining the fully retracted position of the shoes. During reverse vehicle movement, with the drum rotating clockwise and the wheel cylinders are energized, the right hand end of shoe 16 is anchored and the left hand end of shoe 18 is anchored. Both shoes are self-energizing and the levers are each identically constructed and therefore each has the same lever ratio. The brake is therefore equally effective in reverse and forward braking. Owing to the fact that each brake shoe does an equal amount of work and because of the more widespread distribution of the anchoring and actuating forces, then a brake constructed in accordance with the embodiment of FIGURES 1 to 4 may be provided with a torque capacity equal to the previously used mechanical actuated non-servo S-cam brake but in the order of 35 pounds less weight, thus effecting a saving of material and, hence, cost of construction. This 35 pound weight saving per brake also decreases the unsprung weight of the vehicle and permits smaller axles, etc.

Referring next to the embodiment shown in FIGURES 5 to 7, there is illustrated substantially the same leverage system of actuation as in the previous embodiment but with pneumatically operated means as distinguished from the hydraulically operated means shown in FIGURES 1 to 4. In this embodiment the structure corresponding to that of the previous embodiment will be referred to by the same reference numeral but include further the subscript "a." The two brake shoes 16a and 18a each include an arcuate rim 20a and two transverse strengthening webs 26a and 28a, there being friction material segments 22a and 24a which are eccentrically ground so that maximum thickness of the lining segment is approximately midway between the ends of the shoes at the point of maximum pressure of engagement between the lining segments and the opposing cylindrical surface 14 of drum 10a. At the one pair of adjacent shoe ends is a pneumatically operated actuating means 98 which pivots levers 36a on their fulcrums 38a fastened to torque plate 30a which is fastened by bolts 32a to a nonrotatable part of the brake structure.

Between the other pair of adjacent shoe ends is a connecting linkage 100 which transmits the anchoring load of one shoe as applying effort on the other shoe. The linkage is mounted between two levers 101 against which the shoe ends directly bear to transmit anchoring load or receive applying thrust depending upon the direction of drum rotation. The linkage 100 is designed so that the anchoring load of the one shoe is transmitted as applying effort to the other shoe to develop equal applying thrusts on each shoe. This arrangement is sometimes referred to by those skilled in the art as "controlled servo" and the net effect of the linkage 100 is to serve as a replacement for a separate actuating means to obtain greater construction economy. The particular linkage forms the subject matter of a separate patent application and is illustrated herein only to demonstrate the latitude of invention for the novel leverage system for actuating and anchoring the brake.

The shoes are held in a normally retracted position by means of looped leaf springs 102 which are fastened to the torque plate 30a and bear against the ends of the shoes that are combined with the pneumatic actuator, the ends of the shoes combined with linkage 100 being held thereagainst by means of leaf springs 104 which are fastened to levers 101 at one end and are biassed at the other end against the bolt head of the manual adjusters 56a fastened to the brake shoes. The levers 101 are held together by two springs 103 which bottom the linkage in the levers to return the shoes.

The adjusters 56a are essentially the same construction as provided in the previous embodiment and identified in FIGURES 3 and 4. The particular adjuster construction is not an essential part of the present invention and may consist of any of the well known manual adjusters, the only requirement being that the adjuster must have sufficient strength to resist the anchoring load of the shoes and be located between the levers and the shoes.

Referring to FIGURE 6, each pneumatic actuator includes a pneumatic chamber 110 and flexible diaphragm 112 which is clamped between the two halves 114 and 116 which form the housing, these two halves being held together by a clamping band 118. The diaphragm thrust member 120 is operatively connected to a link 122 having a wedge 124 at the end of the link. The spring 126 maintains the diaphragm thrust member 120 in a normally retracted position and spring 128 acting through a washer 130 biases the link 122 rightwardly (FIG. 6) whereby the wedge 124 is withdrawn from the brake assembly.

The pneumatic actuator is mounted on the torque plate through a sleeve 134 which extends through an opening in the cover plate 136 which covers the open end of the drum 10a. The housing can be adjusted for initial positioning by means of a nut 138 which is turned down to move the wedge 124 farther into the brake assembly or out of the brake assembly so that the wedge will have no clearance as initially installed. The two clamping nuts 140 and 142 prevent accidental turning of the nut 138 once it is in its proper operative position.

The torque plate 30a is turned back at 150 to provide the abutments 46a which limit turning movement of the levers 36a and thus distribute the anchoring load between the fulcrum 38a and abutment 46a. A member 160 formed integrally with fulcrums 38a fastened to axle flange 162 by bolts 164 carries a plate 166 which is fastened to 150 by means of interlocking portions 168, the purpose of the plate 166 being to laterally position rocker links 174 and levers 36a. Thus, as shown in FIGURE 7 the wedge 124 is thrust in a direction normal to shoe movement, cam followers 170 will rock within sockets of levers 36a and the lateral component of thrust by the wedge 124 is resisted by rocker links 174.

The levers 36a bear against hardened inserts 176 which are fastened by bolts 178 between the webs 26a and 28a.

In brake operation, when pneumatic pressure is communicated to the chamber 110 the link 122 is moved toward the brake cavity so that wedge 124 forces the cam followers 170 apart, causing levers 36a to pivot on their fulcrums 38a. Assuming counterclockwise rotation of the drum corresponding to forward vehicle movement, the shoe 18a (FIGURE 5) anchors at its right hand end on lever 36a and the anchoring force is communicated through linkage 100 in such amount that the applying effort developed by lever 101 at the right hand end of shoe 16a is substantially equal in amount to the applying effort developed at the left hand end of shoe 18a. Shoe 16a then anchors at its left hand end on lever 36a which resists the anchoring load distributed between fulcrum 38a and abutment 46a. The two shoes 16a and 18a thus do an approximately equal amount of braking work and both are equally effective.

Although only one actuating means is provided, both of the brake shoes are applied at their leading ends and anchors at their trailing ends, this being accomplished by means of the servo linkage 100 interconnecting two of the adjacent shoe ends. The fact that the anchoring load is sustained by a lever having two supports which share the anchoring load makes it possible to distribute the anchoring forces over a greater area and this makes the brake of a greater torque capacity without mere enlargement of the brake parts. When the brake is released, the wedge is returned by means of spring 128, there being in some instances four supplementary springs 180 which are loaded by movement of the wedge 124 in a direction to apply the brake. When the brake is released leaf springs 102 return the ends of the shoes combined with the pneumatic actuator 98 and springs 103 retract the other pair of adjacent shoe ends and levers to a fully retracted position.

When the brake is applied with reverse vehicle movement corresponding to clockwise drum rotation, the end of shoe 16a combined with the pneumatic actuator 98 is the leading end and the end of shoe 16a operatively connected with linkage 100 is the trailing end or anchored end of the shoe, the anchoring force of 16a being transmitted through linkage 100 as applying effort on shoe 18a which anchors on its lever 36a connected with pneumatic actuator 98. In reverse, as well as in forward, both shoes are applied with substantially equal applying force; both shoes are self energizing and do a substantially equal amount of the braking work. The anchoring surfaces on the levers 36a are disposed so that the center of engagement pressure of the shoes 16a and 18a with drum surface 14a is approximately midway between the ends of the shoes and the lining segments are tapered so that this is the location of the maximum lining thickness. Accordingly, from the resulting wear pattern, maximum utility is obtained from the lining before necessity of replacement. When a brake adjustment is needed, the adjusters 56a between the linkage 100 and the shoe ends are manually operated to re-establish the original running clearance between the friction segments and the opposing cylindrical surface 14a of the drum. Since the adjustment is made between the shoe end and the linkage 100, linkage movement does not increase beyond that required at the time of brake adjustment, i.e., the linkage is substantially unaffected by progressive wear of the brake lining, and since the shoes are free floating shoes constructed for pivotal and sliding movement at each of their opposite ends, the brake adjustment will not add to the wedge movement necessary for effecting full brake application. As before described, the actuator movement is in accordance with the prescribed pivotal movement of the levers 36a and does not follow the erratic and irregular movement of the shoe ends and therefore the actuating means is simplified in its operation because of its independence from shoe movement. Such applying action is ideally suited for the reciprocable wedge movement obtained by pneumatic actuators.

Referring next to the embodiment shown in FIGURES 8 to 11, there is illustrated a further embodiment of the invention employing two pneumatic actuators, one between each of the opposite adjacent pairs of shoe ends. In this embodiment, as in the previous embodiment, the two brake shoes are identical and therefore parts corresponding to those in the prior embodiments will be referred to by the same reference numeral but will include further the subscript "b."

The two brake shoes 16b and 18b include an arcuate rim 20b and two transverse strengthening webs 26b and 28b, the two shoes being actuated into engagement with the cylindrical surface 14b of the rotatable drum 10b by means of levers 36b which are mounted for pivotal movement on anchor pins 38b received within torque plate 30b. At the end of the lever opposite its pivotal mounting is an abutment 46b just as in the previous embodiments and the anchoring load of the shoe when it anchors against the lever is distributed between the abutment 46b and the anchor pin 38b so that the anchoring stresses are not localized at any one point. Also, similarly to the previous embodiments, a manually operated adjuster 56b is disposed between one shoe end and its lever 36b so that as the lining wears, the original running clearance between the friction segment and opposing drum surface can be reestablished by operation of the adjusting means. The ends of the shoes are in pivotal and in sliding engagement with inclined surfaces of the levers which provide anchoring surfaces for the shoe end, these inclined surfaces being proportioned and located so that the center of pressure between the lining and the drum is located substantially midway between the ends of the shoe which is the point of maximum wear of the lining. The lining is tapered with a maximum thickness at this center portion of the shoe which is the point of maximum pressure so that greatest utilization is obtained of the lining. The location of the adjuster relatively to the lever has the same advantage cited for the previous embodiments, namely, operation of the adjuster does not affect the pedal stroke requirement for actuating the brake.

Each brake shoe is laterally positioned by means of projections 200 and 202 of the torque plate which are bent in opposite directions to contact a respective one of the transverse strengthening webs in order to locate the shoe.

The shoes are held in a normally retracted position by means of springs 74b stretched between openings in the shoe web and the anchor pins 38b so that the shoes are urged retractively and levers 36b are rotated on their pivot pins until brought into engagement with abutment 46b which is formed from part of the torque plate, as previously described. Each pneumatic actuator 98b comprises a cylinder 204 defining an air chamber 206 and having a piston 208 slidably received therein. A link 210 with a wedge 212 at the end thereof is displaced by the piston 208 against the resistance of return spring 214 to rock the cams 216 and force them apart in the direction of shoe applying movement. A thrust member 218 is disposed between each cam follower 216 and lever 36b. Each thrust member has a conical section 220 received within a socket 222 of the lever 36b and at each lateral side of the thrust member is an integral triangular lug 230, each of which contacts a rocker arm 232 which is seated against a fixed backing plate 234 secured to the torque plate 30b. Between each of the laterally spaced lugs 230 is a rounded end 250 which fits within a notched portion 252 of the cam follower 216.

The housing or cylinder 204 is mounted on the torque plate 30b by means of bolts 260 received through flange 262 and secured by nuts (FIGURE 8) 263 to the torque plate 30b. When air pressure is communicated to the two actuators 98b the pistons 208 are moved against the resistance of spring 214 to displace the link 210, causing the wedge 212 to force the cam followers 216 apart, the lateral component of the wedge action being resisted by rocker arms 232. The spreading force is communicated through the cam followers 216 to the thrust members 218 which cause the levers 36b to pivot on their pivot pins 38b so that, assuming counterclockwise rotation of the drum, corresponding to forward vehicle movement, the shoe 16b will anchor at its left end (FIG. 8) and the right end will be the leading end of the shoe; the shoe 18b will have its leading end at the left hand side of the shoe and the trailing or anchored end at the right side of the shoe. The anchoring force is taken through the levers 36b which distribute the anchoring force between abutments 46b and anchor pins 38b and the anchoring surfaces of the levers determine the location of the maximum pressure of engagement between the lining 22b and the drum which is located approximately midway between the ends of the shoes to obtain maximum utilization of the lining.

In braking with opposite direction of vehicle movement the leading and trailing ends of the respective shoes reverse but the braking action is substantially the same as in forward vehicle movement so that the brake as a whole has approximately the same braking action in both forward and reverse vehicle movement. The levers 36b, while offering mechanical advantage multiplying the applying effort, do not require additional movement to follow up for lining wear beyond that required for each increment of wear between adjustments. For example, should the lining 22b be substantially completely worn, the adjusters 56b can move the shoe outwardly to reestablish the original running clearance while the levers are maintained in their original position. Thus, the same stroke of piston will affect the same braking action. Since the levers are constrained to fixed path of pivotal movement, it is a relatively easy matter to translate this pivotal movement to the axial and tangential movement required of the wedge 212. This is a marked advantage over pneumatic operation in which the cam followers are directly fastened to the brake shoes, since the pneumatic actuator must then follow the various motions required of the brake shoe during braking operation.

Referring next to the embodiment shown in FIGURE 12, the inherent advantage of the invention enabling reduction of brake size will be set forth in a non-servo brake configuration which is suitable for small size trucks or even passenger cars.

Figure 1:
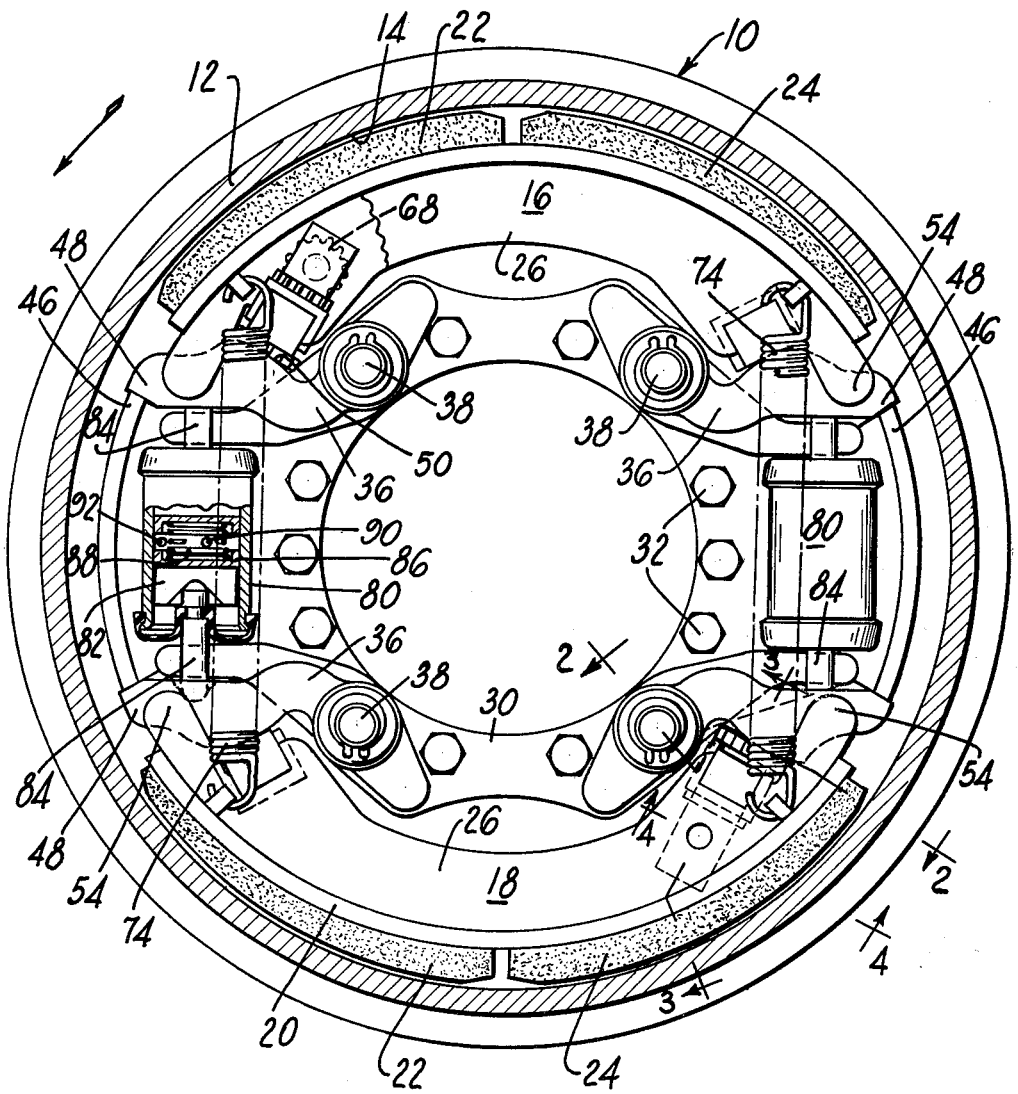

In order to standardize the brake as far as possible, the user may, in the lighter duty trucks, remove one of the wheel cylinder actuators shown in FIGURE 1 and employ the brake as a leading shoe-trailing shoe combination sometimes referred to as a "non-servo" brake. The brake structure shown in FIGURE 12 is substantially identical with that shown in FIGURE 1 except that one of the actuators (the one at the right hand side of the brake in FIGURE 1) is removed. As a result, the brake may be provided at even less cost and is still an acceptable solution where braking requirements are not as high.

In operation, assuming forward rotation of the vehicle corresponding to counterclockwise drum rotation, the shoe 18c will be a leading shoe and provides self energizing braking action and the shoe 16c provides trailing shoe or non-self-energizing braking action. In this case, the two shoes do not do an equal amount of the braking work and the brake is not as effective as the brake shown in FIGURE 1 where both shoes perform the same order of braking action as shoe 18c. The brake is, however, substantially equally effective in forward and reverse vehicle movement. For example, when the vehicle is braked in reverse, this producing clockwise rotation of the drum, then the shoe 16c is an energizing or leading shoe brake and the brake shoe 18c is a de-energizing or trailing shoe brake. Although the brake is not as effective as the one shown in FIGURE 1, various advantages of the brake configuration are nonetheless retained. For example, the anchoring load is distributed more efficiently just as in the embodiment of FIGURE 1 and therefore the brake components may be reduced in size and weight. The center of pressure between the shoe lining and opposing drum surface is approximately midway between the two shoe ends and therefore maximum utilization is obtained of the lining. The shoes are free floating, that is to say, both are pivotal and slidable at each of their opposite ends; and, both anchoring and applying forces are transmitted through a leverage system having an adjusting means which establishes the proper running clearance between the lining and opposing drum surface so that substantially the same piston stroke requirement exists throughout the life of the brakes. Since the piston of the fluid motor actuator does not follow out the shoe while it is being adjusted, the piston stroke is independent of the lining segment thickness and this lining segment thickness can be appreciable in heavy duty braking. As a result, the length of the wheel cylinder actuator need not be large even though some of its stroke is lost by acting through the intermediary of a lever.

In contrast with the embodiment shown in FIGURE 12 which represents the least effective brake configuration, the brake embodiment shown in FIGURE 13 is an embodiment of the invention which is the most effective brake configuration wherein the full anchoring force of one of the shoes is transmitted as applying effort on the other braking shoe. Thus, in place of one of the hydraulic actuators shown in FIGURE 1, there is substituted a strut 250 which is connected between the two levers 36d. The strut passes through aligned openings 252 of a fixed bracket 254 which is fastened to the torque plate 30d. Two washers 256 are retained by rings 257 snapped within grooves 258 of the strut 250 so that movement of the strut in either direction through the opening will compress the spring 259 and tend to return the levers 36d to their original positions. Other than these modifications the structure is identical with that shown in FIGURE 1.

In operation, assuming forward vehicle movement producing counterclockwise rotation of the drum 10d, the brake shoe 18d functions as the primary shoe and its anchoring force is transmitted through lever 36d and strut 250 to effect turning of lever 36d at the leading end of shoe 16d, both shoes then anchoring at the trailing end of shoe 16d on its lever 36d. The anchoring force is distributed between the pivot bolt 38d and abutment 46d. In this embodiment, the brake configuration shown in FIGURE 13 is essentially different from FIGURE 1 in that servo action is introduced. The principal benefits of the invention are retained in that the anchoring surfaces provided by the levers can be so inclined and disposed to locate the point of maximum engagement pressure at a point substantially midway between the ends of the shoes. Thus the lining is tapered with a maximum thickness at this midway point and maximum utilization of lining is thereby obtained.

The brake components are effectively and efficiently arranged by virtue of the fact that the applying forces and anchoring forces are passed through levers which are supported at their opposite ends to provide maximum strength and distribution of forces within the brake. By thus avoiding concentration of braking and applying forces at any one point overstressing can be effectively prevented and the brake may be constructed of smaller and lighter weight components for a substantial cost saving.

The adjusters 56d are located between the levers and the one end of each shoe so that pedal stroke of the hydraulic actuator need not follow up lining wear and hence the actuator can be made of shorter stroke length.

While the two shoes 18d and 16d do not perform an equal amount of work in a given direction of braking, the brake is nonetheless equally effective in over-all performance for each direction of drum rotation. Thus, in forward vehicle movement the brake shoe 18d does approximately one-third the amount of braking work as shoe 16d; but, in reverse vehicle movement when the shoe 16d becomes the primary shoe and shoe 18d becomes the secondary shoe, the relative proportion of braking work distribution is now reversed with shoe 16d performing approximately one-third the amount of braking work of 18d. In over-all operation, however, the braking performance is substantially the same both for counterclockwise and clockwise rotation of the drum corresponding to forward and reverse vehicle movement.

Although only certain selected embodiments of the invention have been chosen for purposes of illustration, it will be understood that these are in no way restrictive of the invention. It is reasonably to be expected that those skilled in the art can make variations and revisions of the invention as will incorporate the herein disclosed principles, and it is intended that such revisions and variations as incorporate the herein disclosed principles will be included within the scope of the following claims as equivalents of the invention.

What is claimed is:

1. In a brake: a rotatable drum having a cylindrical braking surface, a stationary support member, brake shoes slidably arranged in end-to-end relationship on said stationary support, actuating means located between a pair of said adjacent shoe ends, abutment means on at least one of said adjacent shoe ends of one of said shoes, an actuating lever pivotally connected at one end to said support member and so ararnged that at least a portion thereof is located between and engages said abutment means and said actuating means, and anchor means separate from said actuating means and operatively connected to said support member and so located thereon that the other end of said lever will engage said anchor means to anchor thereon during brake actuation in at least one direction and will engage said anchor means in retracted position.

2. The structure as recited in claim 1 wherein adjusting means including said abutment means is provided for varying the distance between said one shoe and said drum.

3. The structure as recited in claim 1 wherein said actuating means comprises a fluid motor having a thrust member operatively associated with said lever for moving the same and said shoe.

4. In a brake: a rotatable drum having a cylindrical braking surface, a stationary support member, brake shoes slidably arranged in end-to-end relationship on said stationary support, actuating means located between a pair of said adjacent shoe ends, abutment means on each of said pair of adjacent shoe ends, a pair of actuating levers each pivotally connected at one end to said support member and so arranged that at least a portion of each is located between and engages a respective one of said abutment means and said actuating means, and anchor means operatively connected to said support member and so located thereon that the other end of at least one of said levers will engage said anchor means to anchor thereon during brake actuation and each of said other ends of said levers will engage said anchor means in retracted position.

5. A brake comprising: a rotatable drum having a cylindrical braking surface; a stationary support member; brake shoes slidably arranged in end-to-end relationship on said stationary support; actuating means located between each pair of said adjacent shoe ends; abutment means on each of said adjacent shoe ends; four actuating levers each pivotally connected at one end to said support member and so arranged that at least a portion of each is located between and engages a respective one of said abutment means and said actuating means; and anchor means operatively connected to said support member and so located thereon that the other end of two of said levers will engage said anchor means to anchor thereon during brake actuation in one direction of drum rotation and the other end of the other levers will engage said anchor means to anchor thereon during brake actuation when said drum is rotating in the opposite direction, and each of said other ends of said levers will engage said anchor means in retracted position.

6. The structure as recited in claim 5 wherein adjusting means is provided at least one end of each shoe and includes said abutment means for varying the distance between each of said shoes and said drum.

7. The structure as recited in claim 5 wherein said actuating means comprises a fluid motor having a pair of oppositely acting pistons and having thrust members operatively associated with a respective one of said levers for moving the same and said shoes.

8. The structure as recited in claim 5 wherein each shoe has both pivotal and sliding engagement at its opposite ends with said levers to provide free floating shoe movement.

9. In a brake: a rotatable drum having a cylindrical braking surface, a stationary support member, brake shoes slidably arranged in end-to-end relationship on said stationary support, actuating means located between a pair of said adjacent shoe ends, an actuating lever pivotally connected at one end to said support member and so arranged that at least a portion thereof is located between and engages abutment means at one of said pair of adjacent ends of one of said brake shoes and said actuating means, said abutment means comprising a member carried by and extending from said one shoe end, means for varying the distance said last named member extends from said one shoe end, and anchor means operatively connected to said support member for receiving anchoring load from the other end of said lever during brake actuation in at least one direction of drum rotation, and for defining the retracted position of said one shoe and said lever.

10. The structure as recited in claim 9 wherein said actuating means comprises a fluid motor having a thrust member operatively associated with said lever for moving the same and said shoe.

11. In a brake: a rotatable drum having a cylindrical braking surface; a stationary support member; brake shoes arranged in end-to-end relationship on said stationary support; actuating means located between a pair of said adjacent shoe ends; abutment means on each of said adjacent shoe ends; a pair of actuating levers each pivotally connected at one end to said support member and so arranged that at least a portion of each is located between and engages a respective one of said abutment means and said actuating means; at least one of said abutment means comprising a member carried by and extending from its respective shoe end, means for varying the distance said last named member extends from its respective shoe end; and anchor means operatively connected to said support member for receiving anchoring load from the opposite end of one of said levers during brake actuation in one direction of drum rotation and for receiving anchoring load from the opposite end of the other of said levers during brake actuation when said drum is rotating in the opposite direction, and for defining the retracted position of said shoes and said levers.

12. The structure as recited in claim 11 wherein said actuating means comprises a fluid motor having a pair of oppositely acting pistons and having thrust members operatively associated with a respective one of said levers for moving the same and said shoes.

13. The structure as recited in claim 11 wherein each shoe has both pivotal and sliding engagement at its opposite ends with said levers to provide free floating shoe movement.

14. A brake comprising: a rotatable drum having a cylindrical braking surface; a stationary support member; brake shoes slidably arranged in end-to-end relationship on said stationary support; actuating means located between one pair of said adjacent shoe ends; abutment means on each of said adjacent shoe ends; four actuating levers each pivotally connected at one end to said support member with one pair of said levers being so arranged that at least a portion of each is located between and engages a respective abutment means of said one pair of said adjacent ends and said actuating means; the other pair of levers being so located that the abutment means of the other pair of adjacent shoes ends will engage at least a portion of a respective one of said other pair of levers; and anchor means operatively connected to said support member and so located thereon that the other end of one of said one pair of levers will engage said anchor means to anchor thereon during brake actuation in one direction of drum rotation and the other end of the other lever of said one pair of levers will engage said anchor means to anchor thereon during brake actuation when said drum is rotating in the opposite direction, and each of said other ends of one pair of said levers will engage said anchor means during retracted position; and means interconnecting said other pair of levers for communicating thrust therebetween as applying effort, and means for retracting said shoes.

15. A brake comprising: a rotatable drum having a cylindrical braking surface, a stationary support member, brake shoes slidably arranged in end-to-end relationship on said stationary support, actuating means located between one pair of said adjacent shoe ends, four actuating levers each pivotally connected at one end to said support member with two of said levers being so arranged that at least a portion of each is located between and engages abutment means at a respective one of said adjacent ends of said brake shoes and said actuating means, and anchor means operatively connected to said support member and so located thereon that the other end of the other two of said levers will engage said anchor means to anchor thereon during brake actuation in each direction of drum rotation and each of said other ends of all said levers will engage said anchor means during retracted position.

16. The structure as recited in claim 5 wherein said actuating means is mechanical.

17. In a brake: a rotatable brake drum, a stationary support, a pair of brake shoes slidably arranged in end-to-end relationship on said support, at least one of said shoes comprising a rim with a pair of axially spaced transverse webs, actuating means located between a pair of adjacent ends of said shoes, at least one actuating lever pivotally mounted at one end on said support, abutment means on at least one end of said one brake shoe, said lever having at least a portion thereof located between and engaging said actuating means and said abutting means, anchoring means for taking anchoring torque from said lever, said lever further having a portion thereof disposed between the ends of said axially spaced webs whereby said one shoe is axially guided by said lever.

18. The structure as recited in claim 4 wherein said anchor means is separate from said actuating means.

19. The structure as recited in claim 9 wherein said anchor means is separate from said actuating means.

20. In a brake: a rotatable drum having a cylindrical braking surface, a stationary support member, brake shoes slidably arranged in end-to-end relationship on said stationary support, actuating means located between a pair of said adjacent shoe ends, an actuating lever pivotally connected at one end to said support member and so arranged that at least a portion thereof is located between and engages abutment means at one of said pair of adjacent ends of one of said brake shoes and said actuating means, said abutment means comprising a member carried by and extending from said one shoe end, means for varying the distance said last named member extends from said one shoe end, and anchor means operatively connected to said support member for defining the retracted position of said one shoe and said lever, said anchor means being arranged to be engaged by the other end of said lever.

21. The structure as recited in claim 20 wherein said anchor means is separate from said actuating means.

References Cited in the file of this patent

UNITED STATES PATENTS

| | | |
|---|---|---|
| 2,372,415 | Eksergian | Mar. 27, 1945 |
| 2,385,168 | Stelzer | Sept. 18, 1945 |
| 2,487,756 | House | Nov. 8, 1949 |
| 2,777,542 | Russell | Jan. 15, 1957 |
| 2,818,140 | Roller | Dec. 31, 1957 |
| 2,822,065 | Goepfrich et al. | Feb. 4, 1958 |
| 2,867,297 | White | Jan. 6, 1959 |
| 2,906,517 | Goepfrich | Sept. 29, 1959 |
| 3,023,852 | Powlas | Mar. 6, 1962 |

FOREIGN PATENTS

| | | |
|---|---|---|
| 785,864 | Great Britain | Nov. 6, 1957 |